United States Patent [19]

Trimble

[11] Patent Number: 5,222,523

[45] Date of Patent: Jun. 29, 1993

[54] VALVE FOR CONTROLLING CONNECTION TO BRANCH PASSAGE

[75] Inventor: Maurice W. Trimble, Newport, United Kingdom

[73] Assignee: Saunders Valve Company Limited, Cwmbran, United Kingdom

[21] Appl. No.: 834,567

[22] PCT Filed: Jun. 25, 1991

[86] PCT No.: PCT/GB91/01025

§ 371 Date: Feb. 14, 1992

§ 102(e) Date: Feb. 14, 1992

[87] PCT Pub. No.: WO92/00476

PCT Pub. Date: Jan. 9, 1992

[30] Foreign Application Priority Data

Jun. 25, 1990 [GB] United Kingdom ............... 9014124
Nov. 16, 1990 [GB] United Kingdom ............... 9024935

[51] Int. Cl.⁵ .................................................. F16K 7/12
[52] U.S. Cl. .................................... 137/863; 251/331
[58] Field of Search ........................ 137/863; 251/331

[56] References Cited

U.S. PATENT DOCUMENTS 2,695,156 11/1954 Ivanek .
2,989,282 6/1961 White .
4,597,412 7/1986 Stark .................................... 137/606
4,721,133 1/1988 Sundblom ........................... 137/883
4,977,929 12/1990 Chinnoch et al. .................. 137/863

FOREIGN PATENT DOCUMENTS 8905417 6/1989 World Int. Prop. O. .
9003532 4/1990 World Int. Prop. O. .

OTHER PUBLICATIONS

Patent Abstracts of Japan, vol. 11, No. 380, Dec. 11, 1987 & JP, A, 62151676 (Sekisui Chem. Co. Ltd) Jul. 6, 1987.

*Primary Examiner*—John C. Fox
*Attorney, Agent, or Firm*—Oblon, Spivak, McClelland, Maier & Neustadt

[57] ABSTRACT

A valve comprises a valve body (2) defining a through passage (3), a branch passage (7), and an aperture (11) in the wall of the through passage. A closure member (12) is movable between a first position in which the closure member seals the aperture and a second position in which the closure member establishes communication between the through passage and the branch passage.

4 Claims, 5 Drawing Sheets

VALVE FOR CONTROLLING CONNECTION TO BRANCH PASSAGE

This invention relates to a valve for controlling connection to a branch passage, and in the preferred embodiment provides a valve which is particularly suitable for providing drainage and sampling facilities in a pipeline system.

Conventionally if it is necessary to provide for the drainage of pipework system, or to provide facility for taking a sample of the fluid within the system, a Tee fitting is provided within the pipework system. Two legs of the Tee constitute a through passage of the pipework system and the third leg of the Tee is directed vertically downwards and is provided with a stop valve which can be opened to take samples or drain the system through the third leg of the Tee. This arrangement has the disadvantage that during normal operation of the system when the stop valve is closed the third leg of the Tee forms a dead leg within the fluid system.

Any fluid contained in the dead leg can become stagnant and act as a site to harbor foreign material, particularly suspended solids and bacterial contaminants. This is particularly a problem in relation to food processing equipment and pipework systems of biochemical installations. If the fluid contained within the pipework systems carries suspended or viscous thixotropic matter such matter may collect within the dead leg so that when the stop valve is opened no fluid is able to flow therethrough. Additionally it is often necessary to clean (CIP) or steam (SIP) in place process pipework systems and valves of conventional design connected to Tee-pieces in pipework cannot be effectively cleaned or sterilised.

According to one aspect of the present invention a valve comprises: a valve body defining a through passage, a branch passage, and an aperture in the wall of the through passage; and a closure member movable between a first position in which the closure member seals the aperture and a second position in which the closure member establishes communication between the through passage and the branch passage.

Such a valve may be mounted in a pipework system with the through passage of the valve body forming part of a flow passage of the pipework system. When the closure member is in the first position the aperture in the wall of the through passage is sealed and accordingly no dead leg exists opening onto the through passage. When the closure member is moved to the second position communication is established between the through passage and the branch passage to enable fluid to flow from the through passage into the branch passage for complete drain down, sampling, or other purposes.

Preferably the closure member is a diaphragm which is sealingly secured to the valve body and, in the first position thereof, engages a seat formed on the valve body. In this case, the aperture is common to the seat and to the through passageway so that when the diaphragm is in the first position the diaphragm forms part of the wall of the through passage. The branch passage can conveniently open onto the diaphragm seat at a point spaced from the aperture whereby when the diaphragm is in the second position communication between the aperture and the branch passage is established via a chamber defined between the diaphragm and the diaphragm seat.

The invention will be better understood from the following description of a number of preferred embodiments thereof, given by way of example only, reference being had to the accompanying drawings wherein.

Figure 1:
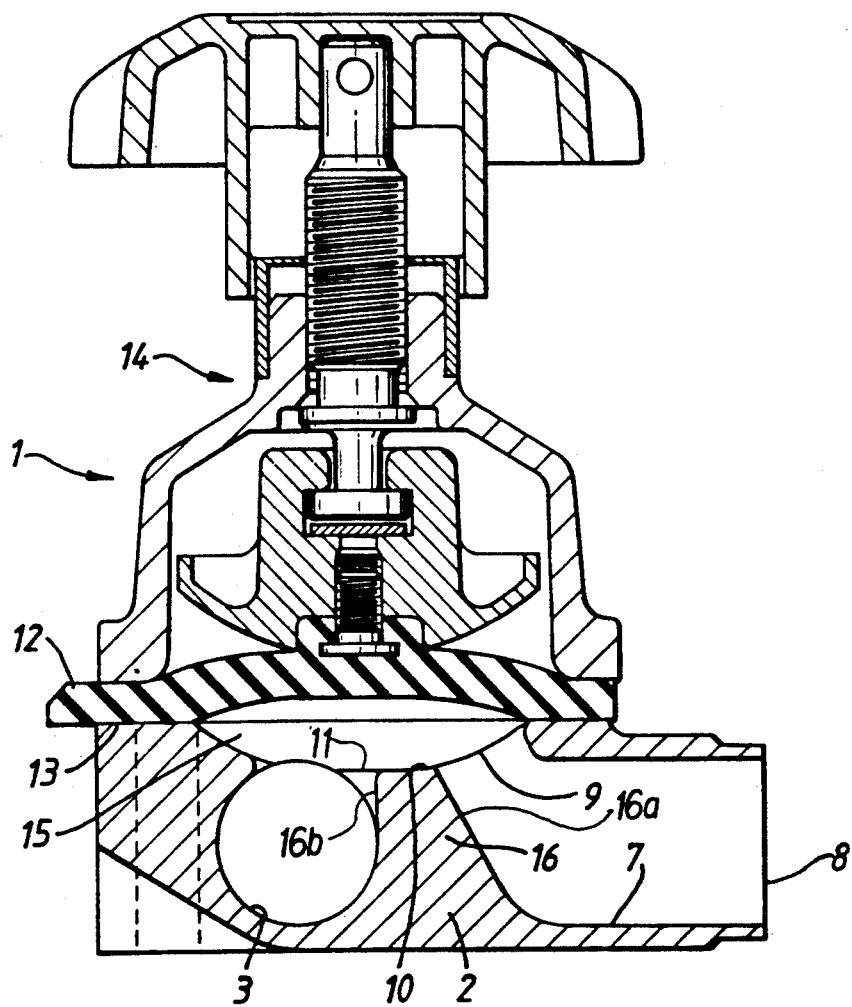
FIG. 1 is a cross-sectional view of one embodiment of the invention.
Figure 2:
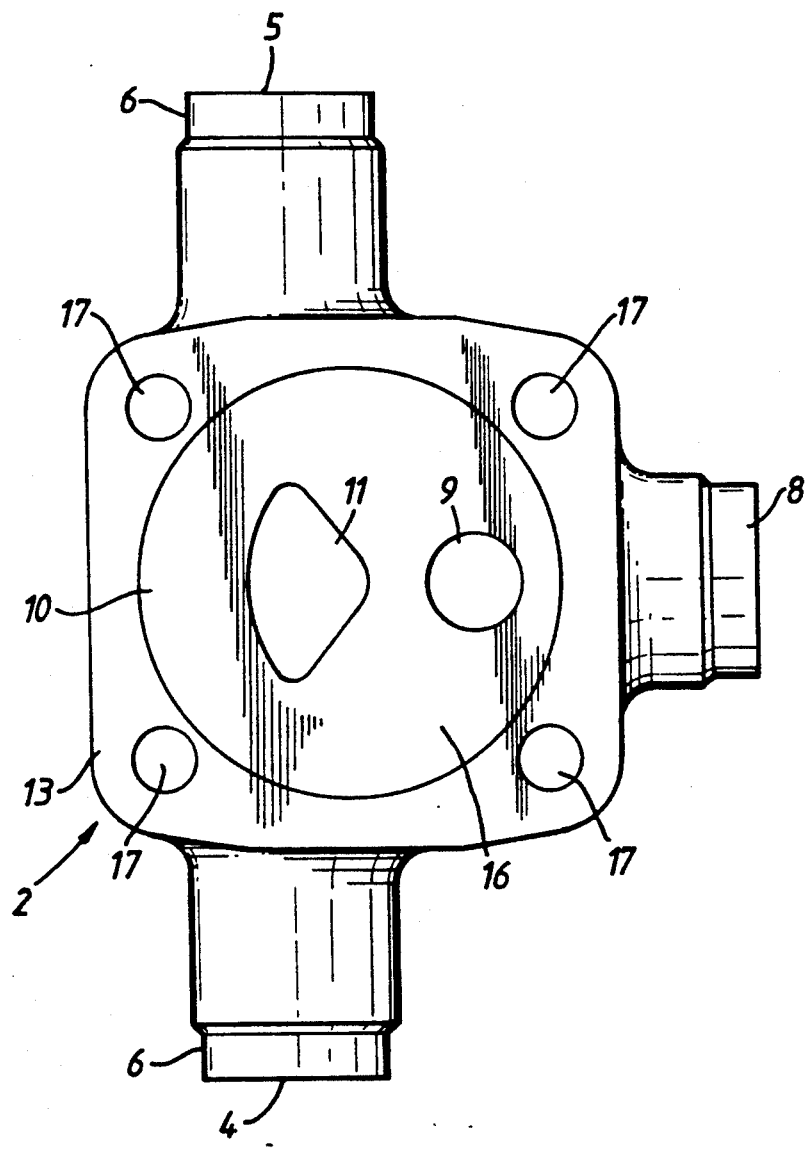
FIG. 2 is a plan view of the valve body of the valve of FIG. 1.

The valve 1 as shown in FIG. 1 of the drawings comprises a valve body 2 formed from a material compatible with the proposed line content. The valve body defines a through passage 3 of substantially circular cross-section which extends in a straight line through the valve body from a first port 4 to a second port 5 as shown in FIG. 2. The valve body also defines a branch passage 7 which extends from a branch port 8 to an aperture 9 formed in a dished diaphragm seat 10 defined by the valve body. The valve body 2, in the zone of the ports 4, 5 and optionally in the zone of the port 8 includes means permitting the valve body to be connected into a pipework system. Such means may comprise a portion 6 of the valve body, adapted to allow the ports to be connected to a pipework system by welding or any other suitable means, for example screw-threads.

The seat 10 intersects the through passage 3 to define an aperture 11 in the wall of the through passage. A weir 16 is thus formed between the through passage 3 and the branch passage 7. The weir 16 has a first side face 16a open to the branch passage 7 and a second side face 16b open to the through passage.

A diaphragm 12 of conventional form sealingly engages a flange 13 surrounding the seat 10 and is provided with a conventional diaphragm valve operating assembly 14 for moving the diaphragm between a first position in which the lower face of the diaphragm 12 sealingly engages the seat 10 and a second position as illustrated in FIG. 1 in which the diaphragm is spaced from the seat 10. The operating assembly 14 may be attached to the valve body in any conventional way; for example, the operating assembly may be bolted to the valve body through bolt holes 17.

In use, the valve body will in general be installed in a pipework system with the through passage 3 horizontal and the branch passage 7 pointing vertically downwards. In this position of the valve body, it will be seen in FIG. 1 that no portion of the second side face 16b of the weir 16 is located below the lowest point of the aperture 11 nor above the lowest point of the through passage 3. During normal operation of the pipework system the diaphragm will be held in the first position by the operating mechanism 14 and will accordingly seal the aperture 11 in the wall of the through passage.

Although the cross-section of the through passage 3 will vary slightly from the circular in the zone of the diaphragm, the fact that the aperture 11 is closed at the level of the wall of the through passage means that there is substantially no dead leg and no possibility of accumulation of either solid matter or stagnant liquid.

When it is desired to take a sample from the pipework system or to drain the pipework system completely the diaphragm is moved to the illustrated second position and, because there is no dead leg within the valve body for the reasons explained above, fluid flows unimpededly from the through passageway, along the second face 16b of the weir, via a chamber 15 defined between the diaphragm 12 and the seat 10 and over the weir 16, through the aperture 9, and out through the branch passage 7 and port 8.

As can be clearly seen in FIG. 2, the apertures 9 and 11 do not intersect the valve seat 10 symmetrically, so the diaphragm is required to close onto an off-centre barrier defined by the weir 16. In tests, a valve designed in accordance with the embodiment shown in FIGS. 1 and 2 is found to operate satisfactorily, and to provide an effective seal with the valve seat 10 even though the weir is not central.

However, the conventional valve operating mechanism 14 and the diaphragm 12 as shown are properly designed for central closure of the valve. Accordingly, a number of alternative embodiments of the present invention are envisaged, where a central weir may be employed between a through passage and a branch passage.

In the ensuing description of these alternative embodiments, and in FIGS. 3 to 10, the same reference numerals will be used to refer to features which are also shown in FIGS. 1 and 2.

Figure 3:
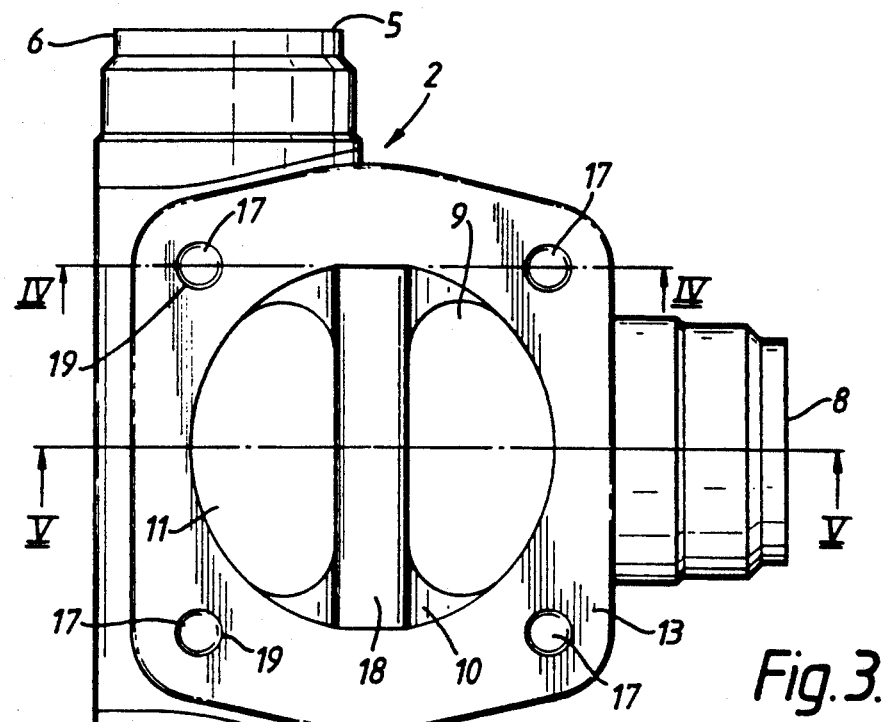
FIG. 3 is a plan view of an alternative embodiment of the invention.

In FIG. 3 the aperture 9 of the branch passage and the aperture 11 of the through passage in the diaphragm seat form between them a central symmetrical weir 18. This is achieved by effectively moving the valve seat, with respect to its position as shown in FIG. 2, so that it is further off-set from the through passage in the direction of the branch passage.

Figure 4:
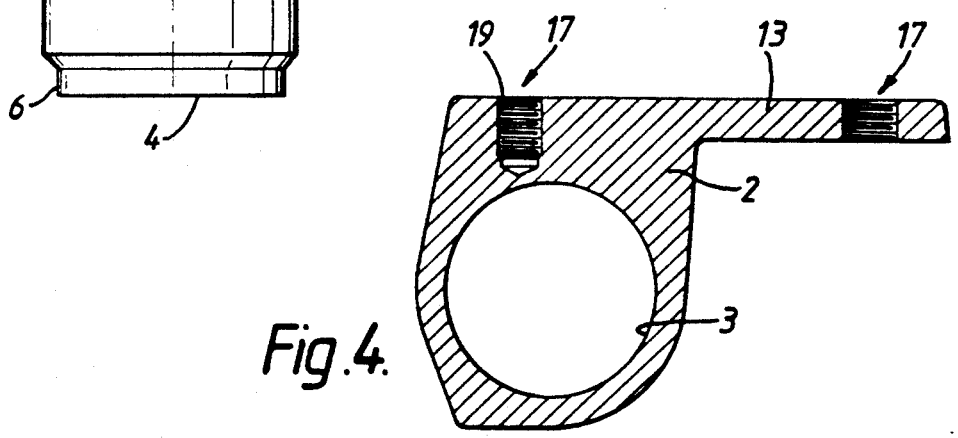
FIG. 4 is a cross-sectional view on line IV—IV of FIG. 3.

As shown in FIG. 4, the advantage of providing the central sealing weir 18 is achieved at the cost of causing the through passage 3 to obstruct the line of two of the bolt holes 17 because of the shift of the valve seat. In this embodiment, therefore, these two bolt holes have blind tapped bores 19, which do not enable the fitting of an operating mechanism which has threaded holes for attachment to the valve body.

Furthermore, in order to accommodate the blind tapped bores 19, the main through passage is depressed further below the valve seat and the weir 18, thus creating a small dead leg 20 which can clearly be seen in FIG. 5.

Figure 5:
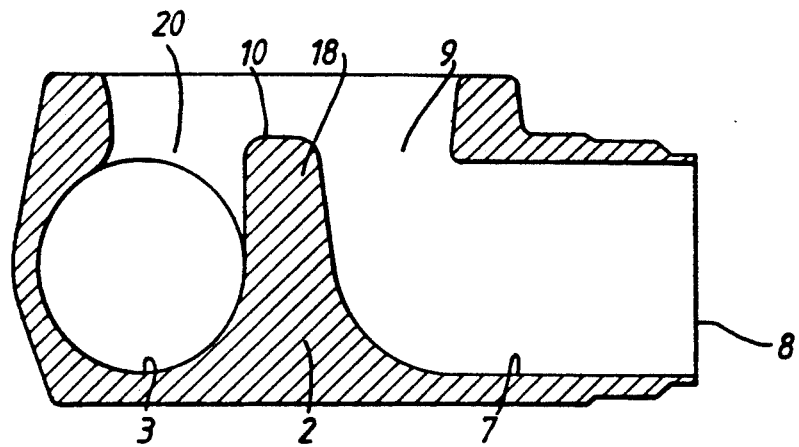
FIG. 5 is a cross-sectional view on line V—V of FIG. 3.
Figure 6:
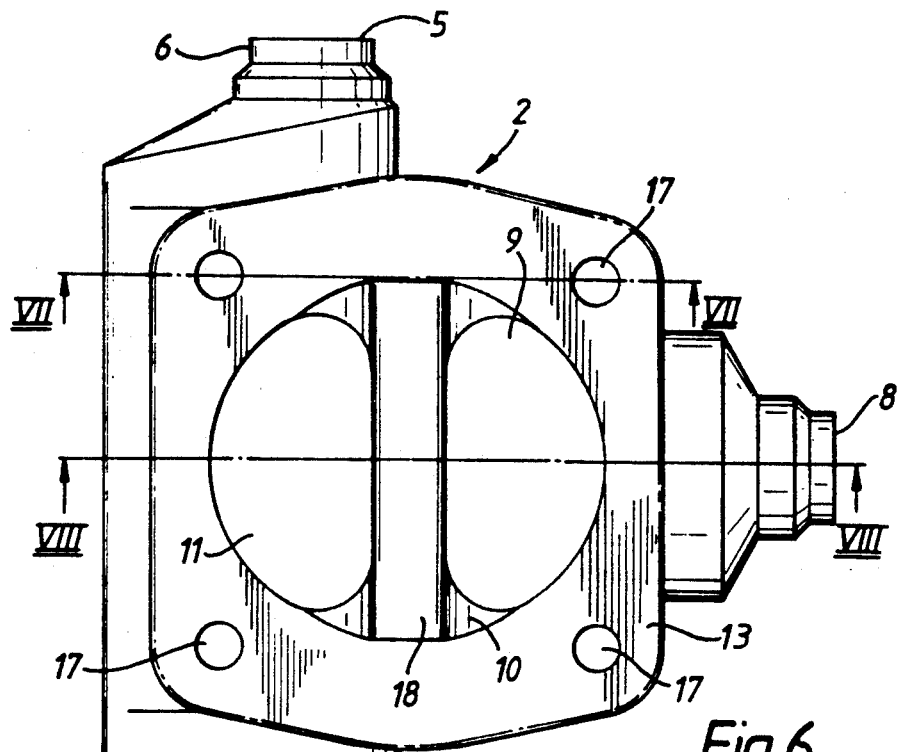
FIG. 6 is a plan view of a third embodiment of the invention.
Figure 7:
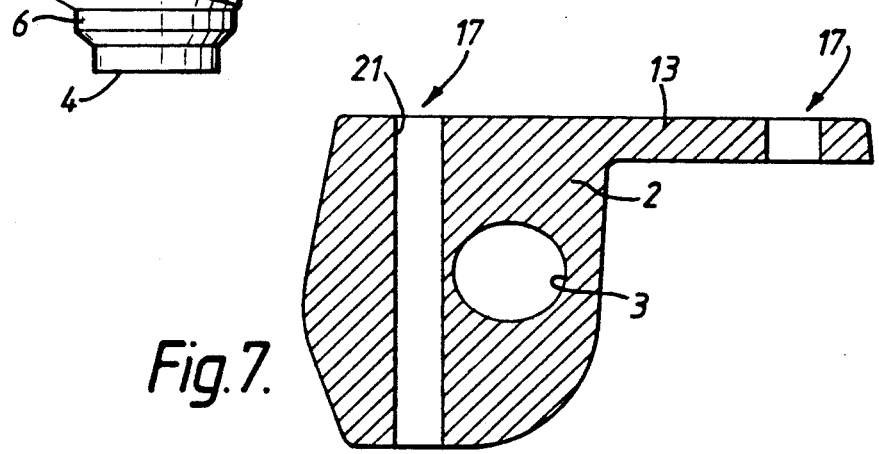
FIG. 7 is a cross-sectional view on line VII—VII of FIG. 6.
Figure 8:
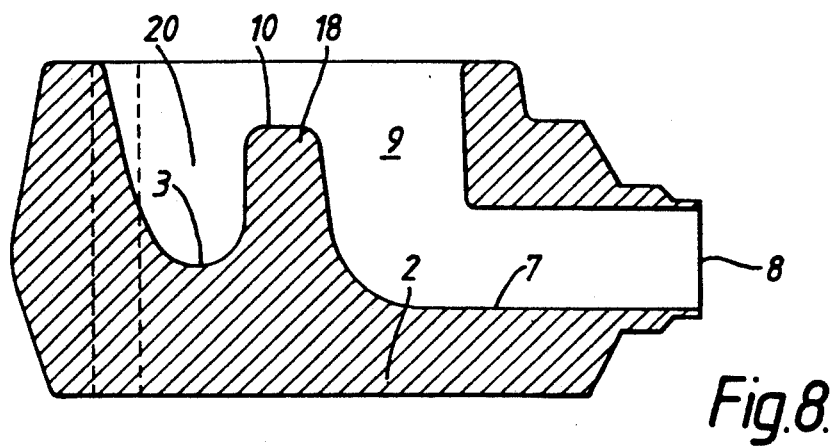
FIG. 8 is a cross-sectional view on line VIII—VIII of FIG. 6.

FIGS. 6 to 8 show another embodiment which is similar to that shown in FIGS. 3 to 5, having the central, symmetrical weir 18. In this embodiment, however, the through passage 3 and the branch passage 7 are of considerably reduced diameter, thus allowing the through passage to be positioned closer to the weir 18 and reducing the volume of the dead leg 20. The smaller diameter through passage 3 enables two bores 21 to pass all the way through the valve body 2 as shown in FIG. 7, such that all the bolt holes 17 are open ended and an operating mechanism having threaded holes for attachment to the valve body may be fitted if required. As with FIG. 1, it can be seen in FIGS. 5 and 8 that when the respective valve bodies are oriented with the branch passages extending downwardly, no portion of each weir side face on the through passage side of its weir is located below the lowest point of the respective apertures nor above the lowest point of the respective through passages, whereby no dead legs exist within the respective valve bodies.

Figure 9:
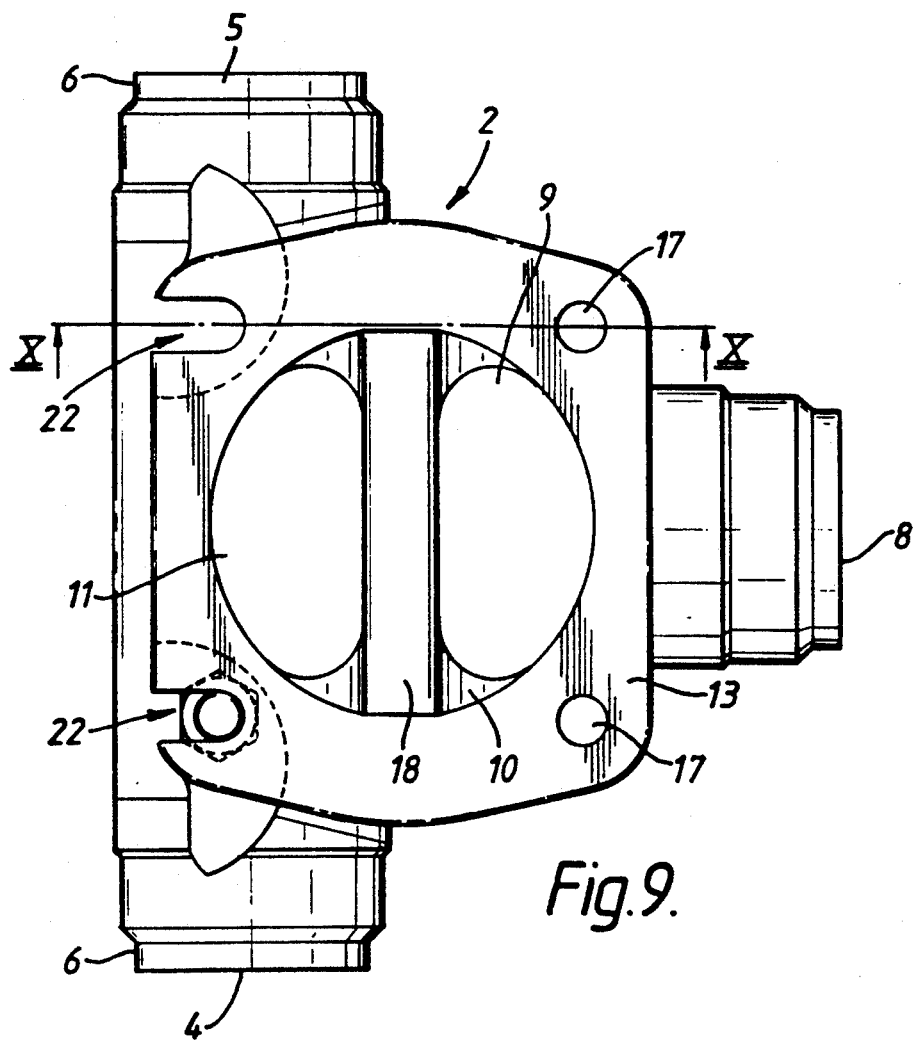
FIG. 9 is a plan view of a further embodiment of the invention.
Figure 10:
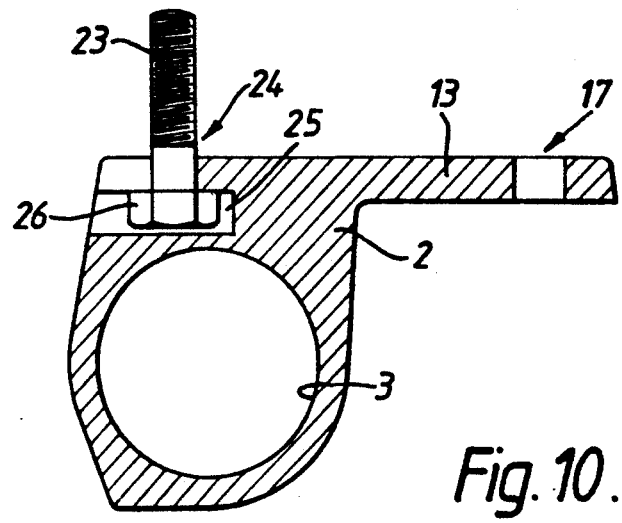
FIG. 10 is a cross-sectional view on line X—X of FIG. 9.

If it is not suitable to use a valve body having a reduced diameter through passage and branch passage, and it is desired to use an operating mechanism having threaded attachment holes, FIGS. 9 and 10, which correspond substantially to FIGS. 3 and 4 respectively, show a possible adaptation of the flange 13 to allow through bolting of the operating mechanism to the valve body.

Instead of the blind tapped bores 19 of FIGS. 3 and 4, the flange 13 of FIGS. 9 and 10 is formed with two slots 22. The slots 22 each have a width adapted to accommodate a shaft 23 of a bolt 24, which can thus be slid into place, while a recess 25 below each slot accommodates a head 26 of the bolt such that an operating mechanism having threaded attachment holes can now be fitted.

Whilst it should be appreciated that the primary purpose of the present valve is for use as a drain down or sampling valve it will be appreciated that the valve may be used for other purposes in which it is necessary to provide control over communication between a through passage and a branch passage. Further, although in the illustrated embodiments the through passage is a straight passage and the branch passage extends substantially perpendicular to the through passage it should be appreciated that embodiments of the invention could be fabricated in which the through passage is a right-angle passage and the branch passage is aligned with one of the limbs of the through passage. Also, although in the illustrated embodiments the valve provides a single branch passage, it will be appreciated that by suitable design a plurality of branch passages may be provided each extending from a respective aperture formed in the valve seat 10 to a respective port.

I claim:

1. A valve comprising a valve body defining a through passage, a branch passage, a weir between said passages and having a first side face open to said branch passage and a second side face open to said through passage, a valve seat formed on said weir, an aperture in the wall of said through passage opening onto said valve seat at the free end of said second side face of said weir, said branch passage opening onto said valve seat at a point spaced from said aperture, said second side face of said weir defining at least a part of a wall of said through passage and being shaped such that when said body is orientated with said branch passage extending downwardly no portion of the second side face is located below the lowest point of said aperture nor above the lowest point of said through passage, and a closure diaphragm movable between a first position in which said diaphragm engages said valve seat to seal off said aperture from said branch passage and a second position in which said closure diaphragm is spaced from said valve seat to establish communication through said aperture of said through passage with said branch passage, whereby when said diaphragm is in its second position and said body is oriented with said branch passage extending downwardly any liquid contained within said valve body drains unimpededly along said second face of said weir, through said aperture and into said branch passage.

2. A valve according to claim 1, wherein the aperture is common to the seat and to the through passageway such that, when the diaphragm is in the first position, the diaphragm forms part of the wall of the through passage.

3. A valve according to claim 2, wherein when the diaphragm is in the second position, communication between the aperture and the branch passage is established via a chamber defined between the diaphragm and the valve seat.

4. A valve according to any preceding claim mounted in a pipework system, with the through passage of the valve body forming part of a flow passage of the pipework system.

* * * * *